Sept. 8, 1925
R. LE SUEUR
WEEDER
Filed July 22, 1922
1,553,250
2 Sheets-Sheet 2
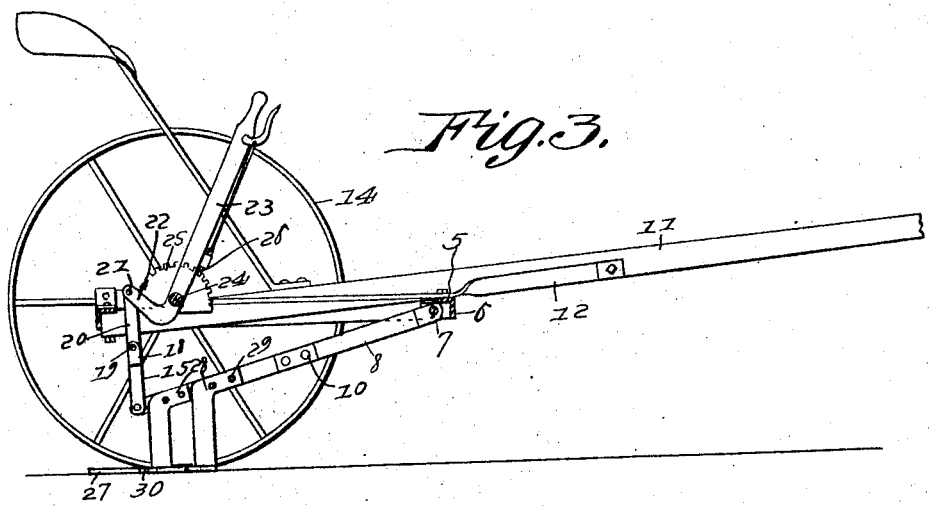

Patented Sept. 8, 1925.

1,553,250

UNITED STATES PATENT OFFICE.

RALPH LE SUEUR, OF LAMBERT, MONTANA.

WEEDER.

Application filed July 22, 1922. Serial No. 576,726.

*To all whom it may concern:*

Be it known that I, RALPH LE SUEUR, a citizen of the United States of America, and resident of Lambert, in the county of Richland and State of Montana, have invented certain new and useful Improvements in Weeders, of which the following is a specification.

This invention relates to weeders and cultivators, and particularly to a wheeled implement adapted for use in cutting weeds at or slightly under the surface of the soil being treated; the said invention furthermore including cultivator blades, associated with cutter blades and effective to disrupt or agitate the soil and disintegrate it while the weeding process is being carried on.

It is a further object of this invention to produce an implement of the character indicated, possessing a plurality of weed cutting and soil agitating blades, preferably arranged in gangs and provided with means for the adjustment of the gangs independently, means being provided for retaining the blades in different positions of adjustment in order that the weed cutters will operate at a greater or less depth, according to the condition of the soil and the vegetation being treated.

It is a further object of this invention to produce a weeder of the character indicated, provided with suspension arms, associated with novel means for holding the suspension arms in oscillatable relation to the frame of the implement; and furthermore, the provision of novel means for connecting the suspension arms in gangs and adjustably suspending them at their ends remote from their pivot or pivots.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 3 illustrates a longitudinal sectional section view thereof; and

Figure 4 illustrates a perspective view of a suspension arm and parts associated with it.

Figure 1:
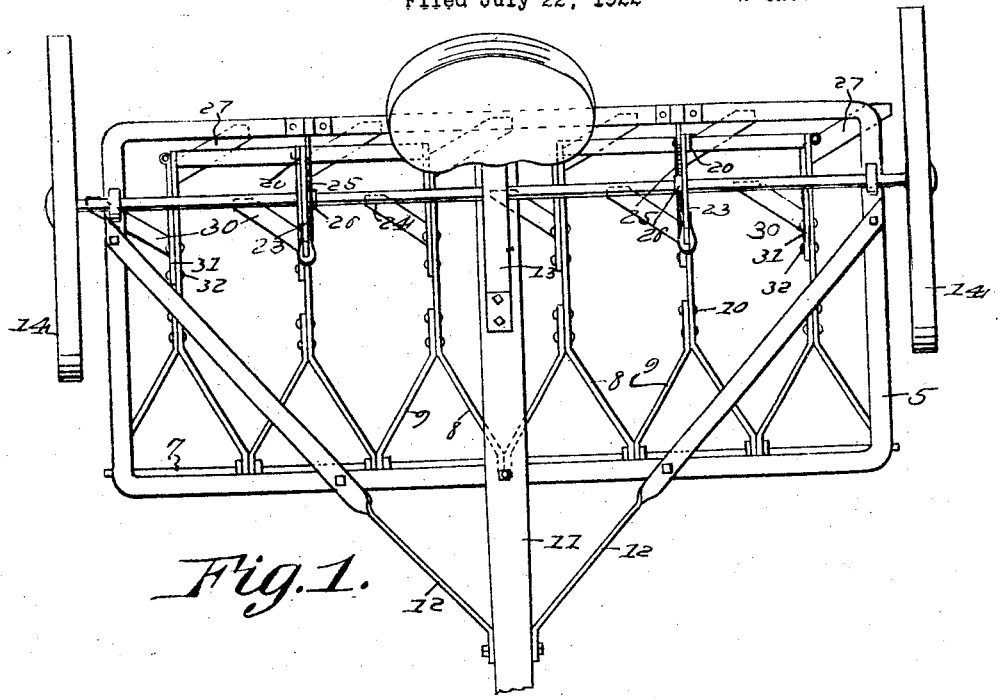
Figure 1 illustrates a plan view of a weeding implement embodying the invention.
Figure 2:
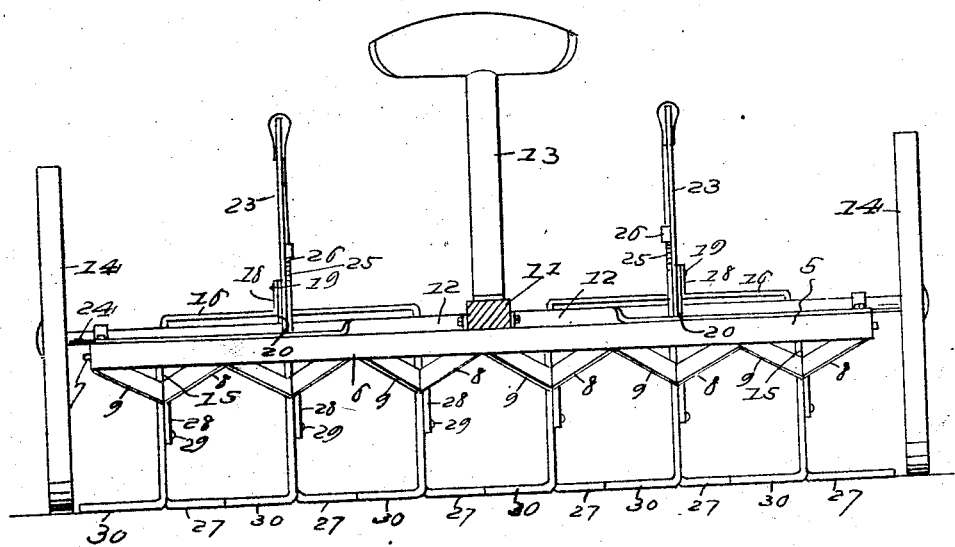
Figure 2 illustrates a front elevation.

In these drawings 5 denotes a frame which is preferably rectangular in plan and formed of angle iron, the depending flanges 6 of which constitute anchorages for a shaft or bar 7, constituting the pivot on which the suspension arms 8 are oscillatable. The shaft 7 is at the front of the frame, and the suspension arms extend rearwardly thereof, as fully shown. Each suspension arm is associated with a spacing arm 9, and each spacing arm may be connected to its respective arm by fastenings such as rivets 10 or the like, and the outer end of each arm is oscillatably mounted on the shaft 7, it being shown that the end of each arm engages the adjacent arm, and thereby the arms are held in proper positions in the frame. A suitable tongue 11 and braces 12 are employed as a part of the draft rigging and as provision for stabilizing and strengthening the structure. A suitable seat 13 is also mounted on the structure.

The frame is supported on wheels 14 and the mounting for the wheels may be changed to suit particular requirements. A detail description of the manner of mounting is therefore believed unnecessary.

The suspension arms are arranged in gangs, and in the present embodiment of the invention, three of them are connected together on each side of the center of the frame. The two end suspension arms of each gang are pivotally connected to depending arms 15 of the bars 16, whereas the central suspension arm of each gang is pivotally connected to a plate 17 which extends downwardly to a degree coextensive with that of the arms 15. The said plate 17 of each gang is clamped between upwardly extending portions 18 of the bars 16, and the said plate and upwardly extending portions 18 are connected together by a fastening 19 of any appropriate type, but preferably, it acts as a pivot by which the links 20 are connected to the yoke. The links have their upper ends hung on a pivot 21 carried by the angularly disposed end 22 of the operating handle 23, and the said handle is oscillatably mounted on an axle 24 of the supporting wheels 14 in the present embodiment of the invention.

Toothed segments 25 may be engaged by detents 26 carried by the handles for holding the suspension arms in different positions of adjustment and for retaining the suspension arms in different operative positions, or suspended out of working position when that condition is desirable.

From the foregoing description, it will be apparent that an operator may move either of the levers for effecting an adjustment of either of the gangs of suspension arms, and that a device embodying the invention will be comparatively inexpensive.

A cultivator blade 27 is carried by each suspension arm, and each blade is formed as an extension of a plate 28 that is secured to the suspension arm by fastenings 29 such as rivets or the like. The blade proper is on a much lower plane than the suspension arm and there is a downward extension between the plate and the blade, resulting in a clearance between the blade and the joint at the plate and the suspension arm so that there is no obstruction for the accumulation of weeds or the like. A second cultivator blade 30 is also attached to each suspension arm, and each blade 30 has an angularly disposed upper end or plate 31 secured to the suspension arm by fastenings 32. The blades 30 and 27 operate on the same plane and are formed in much the same manner, so that the blades are well away from the suspension arms and the clearance between them avoids the accumulation of weeds or the clogging of the apparatus. The blade of one suspension arm extends transversely opposite to that of the other blade on the said arm.

Of course the relative angles of these elements may be changed to suit particular requirements, but the foregoing has been found satisfactory in practice.

I claim:

In combination with a main cultivator frame, cultivator beams arranged on each side of the center of the main frame, the cultivator beams having blades made up of forwardly projecting portions riveted to the beams one in advance of the other, each blade having a depending portion at right angles to the beam, and outwardly and rearwardly diverging ends of sufficient length to overlap the line of draft of similar blades carried by adjacent beams.

RALPH LE SUEUR.